April 28, 1953     W. A. BEDFORD, JR     2,636,640
FASTENING DEVICE
Filed Jan. 5, 1951
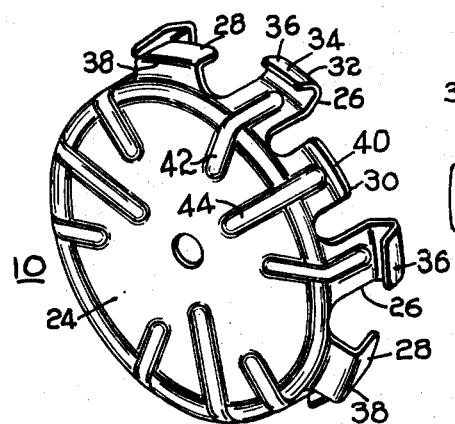
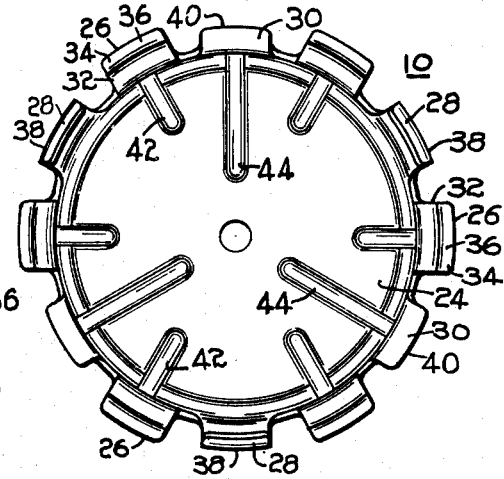
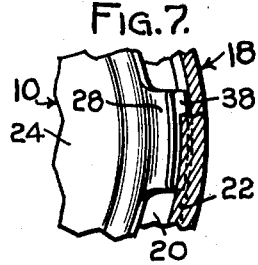
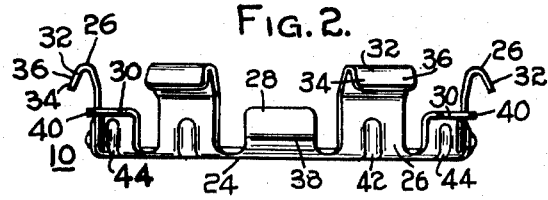
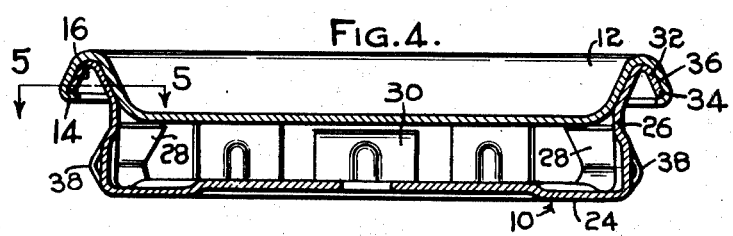
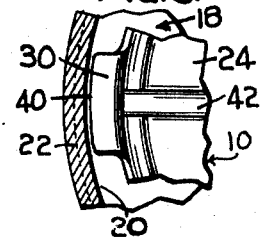
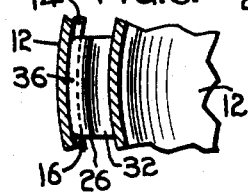
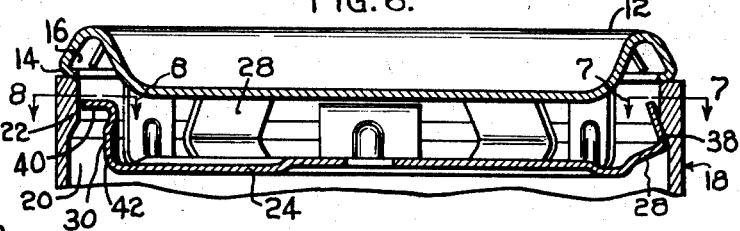
INVENTOR:
WILLIAM A. BEDFORD JR.
By Robert E Ross
AGENT.

Patented Apr. 28, 1953

2,636,640

UNITED STATES PATENT OFFICE 2,636,640

FASTENING DEVICE

William A. Bedford, Jr., North Scituate, Mass., assignor to United-Carr Fastener Corporation, Cambridge, Mass., a corporation of Massachusetts Application January 5, 1951, Serial No. 204,597

4 Claims. (Cl. 220—60)

This invention relates to fastening devices, and has particular reference to a one-piece sheet metal fastener for assembly with a cap member and a body member.

The object of the invention is to provide a fastener having means for snapping engagement with a cap member means for snapping engagement into an opening in a body member, and separate means for alignment of the fastener in the opening in the body member.

A further object of the invention is to provide a fastener having a series of hook members for snapping engagement with a cap member, an independent series of arms for snapping engagement into a walled opening in a body member, and means for abutting the wall of the body member in the opening to prevent substantial lateral movement of the fastener therein.

Other objects of the invention will, in part, be obvious, and will, in part, appear hereinafter.

In the drawing:

Fig. 1 is a perspective view of the fastener embodying the features of the invention;

Fig. 2 is a view in side elevation of the fastener of Fig. 1;

Fig. 3 is a top plan view of the fastener as shown in Fig. 2;

Fig. 4 is a view in elevation, partly in section of the fastener of Fig. 1 snapped into engagement with a cap member;

Fig. 5 is a view in section taken on line 5—5 of Fig. 4;

Fig. 6 is a view in elevation, partly in section, of the assembly of Fig. 4 snapped into engagement with a body member in an opening therein;

Fig. 7 is a view in section taken on line 7—7 of Fig. 6; and

Fig. 8 is a view in section taken on line 8—8 of Fig. 6.

Referring to the drawing, there is illustrated a fastener 10, which is adapted for snapping engagement with a cap 12 having an inwardly turned peripheral edge portion 14 forming a recess 16. The fastener is designed to enable the cap 12 to be assembled with a body member 18 having a walled opening 20 disposed therein and an inner rim 22 disposed about the opening.

The fastener 10 comprises generally a circular base 24, which has a series of cap-engaging arms 26, a series of body-engaging arms 28, and a series of positioning members 30 disposed about the periphery thereof.

The cap-engaging arms 26 are spaced regularly about the outer edge of the base, and extend substantially normal to the plane of the base. The upper end of the arms 26 are provided with reverse bend hook portions 32, which terminate in free end portions 34 extending outwardly and downwardly in relation to the plane of the base, to provide a camming surface 36 to facilitate engagement of the arms 26 with the cap as will be hereinafter described.

The body-engaging arms 28 are regularly spaced about the outer edge of the base and extend upwardly and outwardly therefrom and then upwardly and inwardly, forming a shoulder portion 38 which is spaced outwardly from the edge of the base and disposed between the plane of the base and the plane of the hook portions 32. The shoulders 38 are spaced outwardly from the base a sufficient distance in relation to the diameter of the opening 20 in the body 18 so that they may be snapped into engagement behind the internal rim 22.

The positioning members 30 are regularly spaced about the outer edge of the base and extend upwardly therefrom, and then outwardly in a direction substantially parallel to the base to provide abutting edges 40. The edges 40 are spaced between the plane of the shoulders and the plane of the hook portions 32, and extend outwardly beyond the edge of the base a sufficient distance in relation to the size of the body opening 20 and internal rim 22 to directly abut the internal surface of the rim 22 when the fastener is assembled into the opening.

To impart stiffness to the cap-engaging arms 26 and the positioning members 30, embossments 42 and 44 respectively are provided which extend longitudinally therein and also extend a substantial distance into the base 24. Since it is desirable that the body-engaging arms 28 be capable of substantial flexing, no embossments need be provided therein.

To assemble the fastener with the cap and the body member, the cap and the cap-engaging arms 26 are snapped together by aligning the parts and forcing them together so that the arms 26 are flexed inwardly by the engagement of the camming surfaces 36 with the edge 14 and then snap outwardly behind the rim into the recess 16 (see Fig. 4).

The cap and fastener assembly is then inserted into the opening 20 in the body member so that the base enters the opening. As the fastener is forced into the opening, the body-engaging arms 26 are initially flexed inwardly on the rim 22 and then snap outwardly so that the shoulders 38 pass behind the rim to retain the fastener in the opening.

When the fastener is assembled into the opening, the positioning members 30 enter the opening and abut directly against the internal surface of the rim 22 while the arms 28 are being flexed by the rim, thereby centering the fastener in relation to the opening to insure that all the arms 28 will be flexed the same amount. After the arms 28 have snapped behind the rims, the members 30 are still disposed opposite the rim in abutting engagement therewith so that shear forces applied to the cap or fastener are resisted by said members. Consequently, such shear forces do not tend to deform the body-engaging arms 28, which would weaken the engaging force of said arms.

Since certain obvious modifications may be made in the device without departing from the scope thereof, it is intended that all matter contained herein be interpreted in an illustrative and not in a limiting sense.

I claim:

1. A fastening device for assembly with a cap member having an inturned edge forming a peripheral recess, to enable the cap to be assembled with a body member having an opening with an internal rim portion, said fastening device comprising a base, a series of cap-engaging arms disposed on the base and extending substantially normal to the plane thereof, said arms having reverse bend hook portions disposed on the ends thereof for snapping engagement with said cap, a series of body-engaging arms on the base which extend outwardly in inclined relation to the plane of the base and then inwardly to form a shoulder portion for engagement behind the rim portion in the body opening, and a series of positioning members disposed on the base, said positioning members extending radially and substantially parallel to the base for abutting said body member in the opening to position the fastener laterally therein.

2. A fastening device for assembly with a cap member having an inturned edge forming a peripheral recess, to enable the cap to be assembled with a body member having an opening with an internal rim portion, said fastening device comprising a base, a series of cap-engaging arms disposed about the periphery of the base and extending substantially normal to the plane thereof, said arms having outwardly turned reverse bend hook portions disposed on the ends thereof for snapping engagement with said cap, a series of body-engaging arms disposed about the periphery of the base which extend outwardly in inclined relation to the plane of the base and then inwardly to form a shoulder portion for snapping engagement behind the rim portion in the body opening, and a series of positioning members disposed on the base, said positioning members having radially extending portions which are substantially parallel to the base and relatively non-flexible for abutting said body member in the opening to position the fastener laterally therein.

3. A fastening device for assembly with a cap member having an inturned edge forming a peripheral recess, to enable the cap to be assembled with a body member having an opening with an inwardly extending lip portion disposed thereabout, said fastening device comprising a base, a first series of cap-engaging arms disposed about the base and extending upwardly therefrom, the arms of said first series having end portions which are turned outwardly and then downwardly in inclined relation to the plane of the base to form a hook portion having an outer camming surface to enable said arms to be snapped behind said inturned edge on the cap, a second series of body-engaging arms disposed about the base which extend outwardly and upwardly therefrom and then inwardly and upwardly to form an outer shoulder portion for snapping engagement behind the lip portion about the body opening, and a third series of positioning arms disposed on the base which have portions extending outwardly therefrom and substantially parallel to the base for abutting the wall of said body opening to position the fastener and the cap laterally in relation thereto.

4. A fastening device for assembly with a cap member having an inturned edge forming a peripheral recess, to enable the cap to be assembled with a body member having an opening with an inner rim portion disposed thereabout, said fastening device comprising a base, a first series of cap-engaging arms disposed about the base and extending upwardly therefrom, the arms of said first series having end portions which are turned outwardly and then downwardly in inclined relation to the plane of the base to form a hook portion disposed in spaced relation to the plane of the base; said hook portion having an outer camming surface to enable said arms to be snapped behind said inturned edge on the cap, a second series of flat flexible body-engaging arms disposed about the base which extend outwardly and upwardly therefrom and then inwardly and upwardly to form an outer shoulder portion disposed between the plane of the hook portions and the plane of the base for snapping engagement behind the rim portion about the body opening, and a third series of longitudinally embossed relatively rigid positioning arms disposed on the base which have portions extending outwardly therefrom substantially parallel to the base between the plane of the hook members and the plane of the shoulder portions for abutting the wall of said body opening to position the fastener and the cap laterally in relation thereto.

WILLIAM A. BEDFORD, Jr.

References Cited in the file of this patent

UNITED STATES PATENTS

| Number | Name | Date |
|---|---|---|
| 2,133,789 | Pool | Oct. 18, 1938 |
| 2,552,916 | Becker | May 15, 1951 |
| 2,552,917 | Becker | May 15, 1951 |
| 2,552,919 | Becker | May 15, 1951 |